(12) United States Patent
Hu

(10) Patent No.: US 6,987,866 B2
(45) Date of Patent: Jan. 17, 2006

(54) MULTI-MODAL MOTION ESTIMATION FOR VIDEO SEQUENCES

(75) Inventor: Shane Ching-Feng Hu, Beaverton, OR (US)

(73) Assignee: Micron Technology, Inc., Boise, ID (US)

( * ) Notice: Subject to any disclaimer, the term of this patent is extended or adjusted under 35 U.S.C. 154(b) by 786 days.

(21) Appl. No.: 09/875,375

(22) Filed: Jun. 5, 2001

(65) Prior Publication Data

US 2002/0181745 A1 Dec. 5, 2002

(51) Int. Cl.
*G06K 9/00* (2006.01)

(52) U.S. Cl. .................. 382/107; 382/236; 348/154; 375/240.16

(58) Field of Classification Search .......... 382/107, 382/106, 149, 168, 170, 194, 209, 221, 232, 382/236, 250, 252, 255, 274, 278, 291, 305, 382/171, 172, 238, 240, 243; 375/240.16, 375/240.12, 240.24, 240.22; 700/30, 52; 356/27; 370/506, 395.64; 348/154, 155, 699, 348/700, 688
See application file for complete search history.

(56) References Cited

U.S. PATENT DOCUMENTS

| 4,383,272 A | | 5/1983 | Netravali et al. ........... 358/136 |
|---|---|---|---|
| 4,924,310 A | | 5/1990 | von Brandt ................ 358/136 |
| 5,399,158 A | | 3/1995 | Lauer et al. ................... 604/22 |
| 5,557,341 A | | 9/1996 | Weiss et al. ................ 348/699 |
| 5,654,762 A | * | 8/1997 | Slavin et al. .......... 375/240.24 |
| 5,748,247 A | | 5/1998 | Hu .............................. 348/413 |
| 6,026,195 A | | 2/2000 | Eifrig et al. ................ 328/236 |
| 6,078,618 A | * | 6/2000 | Yokoyama et al. ......... 375/240 |
| 6,094,457 A | | 7/2000 | Linzer et al. ............... 375/240 |
| 6,201,833 B1 | | 3/2001 | Kondo et al. .......... 375/240.12 |
| 6,380,986 B1 | | 4/2002 | Minami et al. ............. 348/699 |
| 6,400,764 B1 | | 6/2002 | Bakhmutsky .......... 375/240.16 |
| 6,421,466 B1 | | 7/2002 | Lin ............................ 382/236 |
| 6,430,317 B1 | * | 8/2002 | Krishnamurthy et al. ... 382/236 |
| 6,434,196 B1 | * | 8/2002 | Sethuraman et al. ... 375/240.12 |
| 6,463,164 B1 | * | 10/2002 | Chiu et al. .................. 382/107 |
| 6,466,623 B1 | | 10/2002 | Youn et al. ............ 375/240.16 |
| 6,473,461 B1 | | 10/2002 | Wang .................... 375/240.16 |
| 6,480,615 B1 | | 11/2002 | Sun et al. .................... 382/103 |
| 6,483,876 B1 | | 11/2002 | Chang et al. .......... 375/240.16 |
| 6,516,033 B2 | | 2/2003 | Nakaya et al. ......... 375/240.17 |

(Continued)

OTHER PUBLICATIONS

Bierling, M., "Displacement Estimation by Hierarchical Blockmatching", Visual Communications and Image Processing 1988, vol. 1001, Cambridge, Massachusetts, Nov. 1998. pp. 942–951.

(Continued)

*Primary Examiner*—Daniel Miriam
*Assistant Examiner*—Seyed Azarian
(74) *Attorney, Agent, or Firm*—Dorsey & Whitney LLP

(57) ABSTRACT

A method and system for estimating motion between a reference image and a search image of a video image sequence. Motion vectors are determined for pixel blocks of the reference image of the video image sequence. The major modes of the motion vectors for the reference image are identified and used for determining each pixel block of the reference image, if a better match can be made based on the major modes of the motion vectors.

68 Claims, 1 Drawing Sheet

U.S. PATENT DOCUMENTS

| | | | |
|---|---|---|---|
| 6,519,005 B2 | 2/2003 | Bakhmutsky et al. | 348/415 |
| 6,532,264 B1 | 3/2003 | Kahn | 375/240.16 |
| 6,532,265 B1 * | 3/2003 | Van der Auwera et al. | 375/240.16 |
| 6,563,874 B1 | 5/2003 | Lu | 375/240.12 |
| 6,594,397 B1 | 7/2003 | Hu | 382/236 |
| 6,639,944 B1 | 10/2003 | De Haan et al. | 375/240.17 |
| 6,671,319 B1 | 12/2003 | Chang et al. | 375/240.16 |
| 6,690,728 B1 | 2/2004 | Chang et al. | 375/240.16 |
| 6,690,730 B2 | 2/2004 | Choi | 375/240.16 |
| 6,697,427 B1 | 2/2004 | Kurak, Jr. et al. | 375/240.03 |
| 6,748,017 B1 | 6/2004 | Joung | 375/240.16 |
| 6,782,054 B2 | 8/2004 | Bellers | 375/240.27 |
| 2001/0026590 A1 | 10/2001 | Kang et al. | 375/240.16 |
| 2001/0028681 A1 | 10/2001 | Choi | 375/240.12 |
| 2001/0031004 A1 | 10/2001 | Kim et al. | 375/240.16 |
| 2001/0046264 A1 | 11/2001 | Fandrianto et al. | 375/240.16 |
| 2001/0053185 A1 | 12/2001 | Kaup | 375/240.24 |
| 2002/0012396 A1 | 1/2002 | Pau et al. | 375/240.16 |
| 2002/0034250 A1 | 3/2002 | Yoo | 375/240.16 |
| 2002/0041699 A1 | 4/2002 | Kim | 382/107 |
| 2002/0054642 A1 | 5/2002 | Ma et al. | 375/240.16 |
| 2002/0080880 A1 | 6/2002 | Park et al. | 375/240.16 |
| 2002/0106021 A1 | 8/2002 | Yang et al. | 375/240.03 |
| 2002/0113901 A1 | 8/2002 | Osberger | 348/699 |
| 2002/0131500 A1 | 9/2002 | Gandhi et al. | 375/240.16 |
| 2002/0163968 A1 | 11/2002 | Moschetti | 375/240.16 |
| 2003/0035592 A1 | 2/2003 | Cornog et al. | 382/284 |
| 2003/0165194 A1 | 9/2003 | Assaf | 375/240.16 |
| 2003/0190059 A1 | 10/2003 | Piccinelli et al. | 382/107 |
| 2004/0071215 A1 | 4/2004 | Bellers | 375/240.16 |

OTHER PUBLICATIONS

Blanc–Feraud, L. et al., "Motion Estimation Involving Discontinuities in a Multiresolution Scheme", Optical Engineering, vol. 23,. No. 7, Jul. 1993. pp. 1475–1482.

Stiller, C., "Object–Oriented Video Coding Employing Dense Motion Fields", Image and Multidimensional Signal Processing, IEEE International Conference on Acoustics, Speech and Signal Processing, vol. 5, Apr. 1994. pp. 273–276.

Tekalp, A., "Digital Video Processing", Prentice Hall PTR Upper Saddle River, New Jersey, 1995. pp. 502–507.

* cited by examiner

001
MULTI-MODAL MOTION ESTIMATION FOR VIDEO SEQUENCES

TECHNICAL FIELD

The present invention relates generally to the field of video signal processing, and more particularly, a system and method for hierarchical block motion estimation of video sequences.

BACKGROUND OF THE INVENTION

Video is typically represented by sequences of two-dimensional image frames or fields. In providing the information representing the sequence of images, however, a bandwidth issue may exist because of the amount of data that needs to be transmitted. In order to provide video information that accommodates potential bandwidth issues, video compression techniques are needed. In a typical compression technique, frames are removed from the sequence of images prior to providing the information, and then, prior to when the images are to be displayed, the images that have been removed need to be reconstructed. One method of reconstructing images is through the use of motion estimation. That is, image frames are constructed based on the estimated motion of objects displayed by the available image frames. More generally, motion estimation can be used for a variety of other video signal processing purposes as well.

Different techniques have been developed for the purposes of estimating motion using available image frames. One such technique of motion estimation employs a block matching technique. In block matching methods, an image is subdivided into square or rectangular blocks having constant sizes or having a prescribed plurality of picture elements, for example, 16×16 or 8×8 picture elements per block. Motion vectors representing the estimated motion from a previous search image are typically determined for each of the blocks of a reference image. In simple applications of the block matching method, the same motion vector for an entire block is attributed to each of the picture elements in the block. Generally, in determining the motion vector for each block of the reference image, a range of possible motion vectors is determined for a respective block using a least difference calculation. From the determined ranges, the motion vector to a block in the search image frame having the least calculated difference from a block in the present reference image is accepted as the motion vector for the block in the reference image frame. Image frames can the be constructed using the motion vectors to fill in those images that were removed during video compression.

In addition to the basic block matching technique previously described, refinements to the basic process have been developed to provide more accurate motion estimations. For example, one refinement provides an iterative block matching technique where the matching process is repeated for blocks of decreasing size. Following the determination of motion vectors for blocks of a first size, the blocks are then sub-divided into smaller child blocks. The child blocks then inherit the motion vector of the parent block in which they are located as a starting point from which a more precise motion vector for each of the child blocks may be calculated. In another refinement, block matching is based on hierarchical processing with different block sizes, starting with coarse resolution blocks at a higher level of the pyramid, and advancing through finer resolution layers for at each layer of the pyramid. A predicted motion vector that is calculated for each block is used to point to a search region in which a matching search block is likely to be located. However, as the resolution gets finer, and the effective block size gets smaller, there are objects for which the parent motion vectors no longer apply and new motion vectors need to be found.

In another refinement of the block matching technique, a quad tree-like sub-division process is used to refine the motion vector field from a coarse to a fine resolution. In this process, the motion vector for the parent block of the reference frame are initially determined. Each parent block is then sub-divided into child blocks, which inherit the motion vector of its parent block. A refinement process is performed where a new motion vector may be attributed to a child block if a local block search around the vicinity of the block to which the inherited motion vector points yields a better matching search block. Thus, for each of the child blocks, a motion vector search is performed. However, the search is restricted to a set of candidate motion vectors consisting of the motion vectors associated with the parent and child blocks adjacent to the child block for which a motion vector is being determined. Although this block matching technique maintains smoothness of the motion field, it may be the case that the true motion vector is not found in the immediate surrounding neighborhood. That is, the candidates from which a motion vector is searched may be too constrained for accurate motion estimation for multiple non-planar motion surfaces, such as for scrolling text credits overlay, and multiple moving foreground and background objects in video scenes. Simply extending the neighborhood increases computational costs as well as the possibility of false matches.

Therefore, there is a need for a system and method that facilitates motion estimation that can escape typical neighborhood constraints in determining motion vectors.

SUMMARY OF THE INVENTION

The present invention is directed to a method and system for estimating motion between a reference image and a search image of a video image sequence. Motion vectors are determined for pixel blocks of a reference image of the video image sequence. The major modes of the motion vectors for the reference image are identified and used for determining each pixel block of the reference image, if a better match can be made based on the major modes of the motion vectors. A hierarchical process may be employed where the method is performed for a first image resolution, and then repeated for continually finer image resolutions until the method is completed for an original image resolution.

The determination of the respective motion vectors for the pixel blocks of the reference may be accomplished by attributing a motion vector from a related lower resolution pixel block and refining the respective attributed motion vector for each pixel block. Refinement of the attributed motion vectors may be performed by calculating an error measure for a pixel block in a reference image with respect to pixel blocks in a search image in the vicinity of the pixel block in the search image to which the attributed motion vector points, and if a better match is determined, associating the vector pointing to the better matching pixel block in the search image with the pixel block in the reference image.

The major modes of the motion vectors may be performed by compiling a list of the motion vectors for the image in descending order of the frequency of occurrence, and defining the motion vectors occurring more times than a threshold value as the major modes.

A better match can be determined by calculating for a pixel block of a reference image an error value for every pixel block of a search image to which the major modes of the motion vectors point, and comparing the calculated error values to an initial error value, the initial error value representing an error measure between the pixel block of the reference image and the pixel block of the search image identified by the motion vector determined initially for the pixel block.

The method can also incorporate a looping routine where a respective predicted motion vector for pixel blocks a subsequent reference image of the video image sequence is calculated from the motion vectors determined for the pixel blocks of a previous reference image. A list of the motion vectors for the pixel blocks of the subsequent reference image are compiled in descending order of the frequency of occurrence and then the predicted motion vectors of the subsequent image are refined. Based on the major modes of the motion vectors for the subsequent image for each pixel block of the subsequent image, a determination of whether a better match exists is then made.

DETAILED DESCRIPTION OF THE INVENTION

Embodiments of the present invention provide a multi-modality motion estimation system and method which facilitates the estimation of motion based on major modes of the motion field of a reference video frame. As a result, the determination of motion vectors can be more dynamic and can escape neighborhood constraints when necessary. The motion estimation can be performed in a hierarchical fashion where the method is repeated for continually higher levels of image resolution until the process is completed for the original image resolution. Certain details are set forth below to provide a sufficient understanding of the invention. However, it will be clear to one skilled in the art that the invention may be practiced without these particular details. In other instances, well-known circuits, control signals, timing protocols, and software operations have not been shown in detail in order to avoid unnecessarily obscuring the invention.

Figure 1:
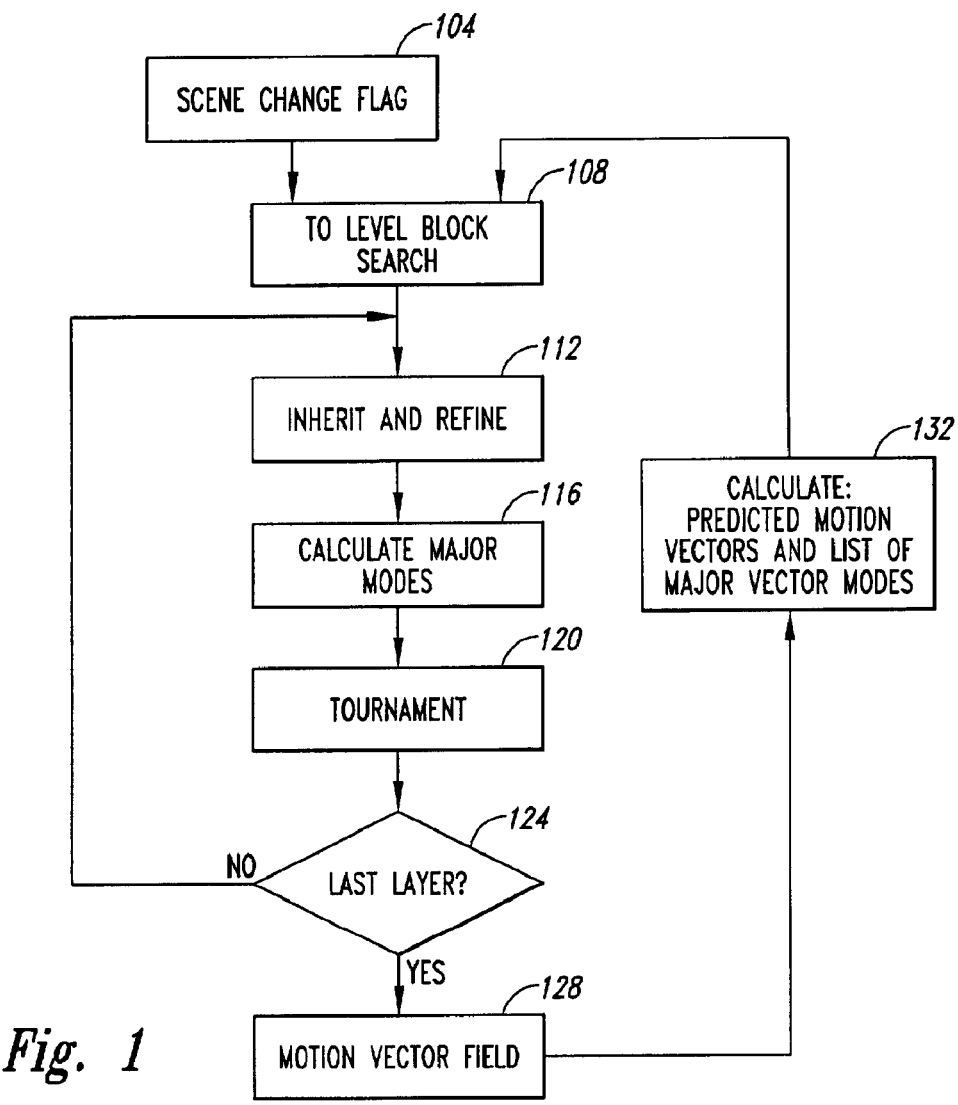
FIG. 1 is a process flow diagram of an embodiment of the present invention.

Illustrated in FIG. 1 is a flow diagram of an embodiment of the present invention. It will be appreciated that the following description is being provided as an example for illustrative purposes only, and should not interpreted as limiting the scope of the present invention to the details discussed.

The motion estimation typically involves two images: a reference or new image and a search or previous image. For each video frame, a multi-resolution pyramid is constructed. The pyramid is constructed with a predetermined number of resolution layers. By low pass filtering or down-sampling of a finer resolution layer, coarser resolution layers may be obtained. For example, in the case where the input frames are in a high-definition (HD) video format, typically, 1920 pixels/scanline×1080 scanlines, the input video can be down-sampled five times, each time down-sampling by a ratio of two in both the horizontal and vertical directions. Thus, the 1920×1080 HD video format is reduced to approximately 60×34 at the coarsest resolution (i.e., top-level) layer. As will be discussed in greater detail below, the multi-resolution pyramid from a previous image frame is buffered in a memory for later use.

For each of the resolution layers of the pyramid, the reference and search images are divided into an array of blocks for which motion vectors will be determined. The blocks of the reference image will be referred to herein as reference blocks and the blocks of the search image will be referred to as search blocks. The dimension of the block themselves remains the same for each of the different resolution layers, but because the resolution at each layer is different, the effective resolution of the blocks are different per layer as well. An example of a typical pixel block dimension is 16×16 pixels.

For every block in the reference image, the objective is to find the displacement or motion vector pointing to a search block in the search image such that the displaced search block is the "best match." It will be appreciated that the determination of the quality of the match can be made by applying a variety of calculations. A well-known technique that may be used to measure block correlation is the sum of absolute differences (SAD) of a block of pixels in a reference frame F(t) with respect to a displaced block of pixels in a search frame F(t−T). Higher powers of the measure may also be used. Calculation of the block SAD is defined as follows:

$$SAD(x_0, y_0, dx, dy) = \sum_{j=0}^{M-1} \sum_{i=0}^{N-1} DFD(x_0 + i, y_0 + j, dx, dy)$$

where SAD is the block sum of the displaced frame pixel difference (DFD), $(x_0, y_0)$ refers to the upper left corner of the block of pixels with a dimension of M×N pixels, (dx, dy) is the displacement of the pixel in the search frame F(t−T). The DFD is the absolute difference of the pixel in frame time (t) with displaced pixel in frame time (t−T). The definition for the DFD is as follows:

$$DFD(x,y,dx,dy)=|F(x,y,t)-F(x+dx,y+dy,t-T)|$$

where T is the temporal distance between reference frame F(t) and search frame F(t−T), (x,y) is the coordinate of the pixel, and (dx, dy) is the displacement of the pixel in the search frame F(t−T).

Operation of embodiments of the present invention will be described by way of the following example. However, it will be appreciated that the details of the example are provided for illustrative purposes, and should not be interpreted as limiting the scope of the present invention.

An input video frame including a luminance signal is provided for motion estimation. The luminance signal of the input video frame or field is received along with a scene change flag (step 104). When the scene change flag is set, it indicates that the current input video frame has started a new scene. Such flags are well-known in the art and will not be discussed in further detail.

In the following example, the image received has the change of scene flag set, thus indicating that the image is the first of a new scene and the motion search will begin without the use of any prior motion tracking information. That is, the image signaling the scene change will be the search image for the following received image, which will become the reference image. Following receipt of the reference (following) image, the initial motion estimation is performed using the coarsest resolution image of the reference and search pyramids (step 108). A conventional method of determining the motion vectors of the blocks of the first or top-level resolution layer will be used for the first reference image after a scene change is indicated. Many such techniques are well-known and may be used to establish the motion vectors for the top level blocks. For example, a pre-defined fixed search radius could be used in the block matching process.

After the completion of the initial top-level block search following a scene change, each of the blocks will have an associated motion vector. At the next highest resolution layer of the pyramid, each child block of the finer resolution layer inherits the motion vector of its parent block (step 112). That is, the motion vector of a parent block of a coarser layer is attributed to each of its child blocks of the next highest resolution layer. The inherited motion vector is properly scaled to account for the difference in sampling factor between the parent and child layer in the pyramid.

The respective motion vector that is inherited by each of the blocks of the next highest resolution layer provides a starting point from which the respective motion vectors are further refined (step 112). An example of a suitable refinement technique is to search around the search block to which the inherited motion vector is directed for a predefined small radius and determine if a better match search block can be found. For example, a radius for refinement may be set at ±1 pixel. Consequently, the SAD will be calculated for each of the eight search blocks surrounding the search block pointed to by the inherited motion vector and, if a better match is determined based on the SAD, a new motion vector will be associated with the reference block. It will be appreciated, however, that other refinement techniques may be applied in embodiments of the present invention as well, and consequently, the previous method should not be interpreted as limiting the scope of the present invention.

Following the local refinement searches, a histogram of the motion vectors for the current resolution layer is constructed. The major modes, up to a certain number of modes, is extracted from the histogram for a subsequent tournament stage, which will be described in more detail below (step 116). For example, the major modes that may be candidates can be limited to the five or six modes having the greatest frequency of occurrence. In the alternative, to minimize spurious matches, modes having fewer occurrences than a minimum threshold are rejected as candidates. The resulting list is arranged in the order of the frequency of occurrences, such that in the tournament stage, modes having higher frequencies have priority.

During a tournament stage (step 120), the error measure, for example, the SAD, associated with every motion vector in the list of the major modes is calculated. In selecting the final motion vector for a reference block, the process begins by using its refined motion vector with its associated error measure as the initial setting. The tournament process is carried out with the higher frequency mode first, such that the outcome favors the majority mode. Traversing down the mode list, if the error measure of the current mode is less than the current setting by a prescribed margin, the current setting is replaced by the values of the current mode. That is, a new motion vector and its associated error measure are assigned to the current reference block. As a result, if the inherited motion vector is an outlier, one of the motion vectors in the mode list will most likely be selected and replace the inherited motion vector. The prescribed margin by which the difference between the error measure of the current mode and the current setting must exceed is specified such that hysteresis is presented to favor the first selection.

As illustrated in FIG. 1, the steps inheriting a scaled motion vector and the further refinement of the inherited vectors, calculation of the major modes of the current resolution layer, and the tournament process, are carried out for the finer resolution layers of the pyramid until the full resolution layer is completed (step 124).

As previously mentioned, in the present example a scene change was indicated by the input video image. However, where the new input frame or field is a continuation of the same scene, the previously derived motion field can provide motion-tracking information to help the derivation of the motion field for the new reference image. That is, motion tracking of the previous motion field is incorporated in the initial top level search for the new reference image (step 128). Through this process, the top-level blocks of the new reference image inherit the motion-tracking information from the previous full resolution motion field for the former reference image. The following information is derived from the previous full resolution motion field with the proper scaling (step 132):

a predicted motion vector for each reference block in the top-level reference frame is calculated from the corresponding local extent of the previous full resolution motion field; and a motion vector histogram is constructed from the full resolution motion field, from which a list of the major motion vector modes is extracted.

For every block of the reference image, the search involves a refinement search of a very small radius around the predicted and scaled motion vector inherited from the previous full resolution image. After the refinement, a tournament process similar to that previously described is carried out for each of the top-level blocks of the reference image. The resulting output motion vector field for the top-level resolution layer is then provided into the iteration loop for determination of the full resolution motion field of the new reference image.

Figure 2:
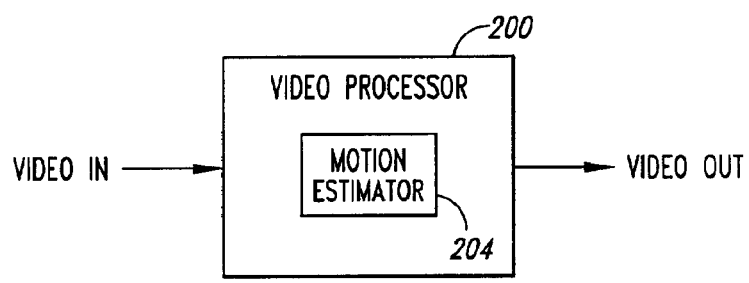
FIG. 2 is a block diagram of a video processor according to an embodiment of the present invention.

FIG. 2 illustrates a video processor 200 in which embodiments of the present invention may be implemented. Included in the video processor 200 is a motion estimator 204 for estimating motion in sequences of video images according to aspects of the present invention. It will be appreciated that there are many well-known techniques for implementing the video processor 200 and the motion estimator 204 described herein, and, although a more detailed description of the various techniques has not been provided, those of ordinary skill in the art have sufficient understanding to practice embodiments of the present invention. It will be further appreciated that embodiments of the present invention may be practiced using conventional software language, conventional hardware circuitry, or combinations thereof, well understood by those of ordinary skill in the art. In either case, the description provided herein is sufficient to allow those of ordinary skill in the art to practice the present invention without the need for undue experimentation.

It will be appreciated that embodiments of the present invention may be practiced using conventional software language and conventional hardware circuitry well understood by those of ordinary skill in the art. In either case, the description provided herein is sufficient to allow those of ordinary skill in the art to practice the present invention without the need for undue experimentation. Moreover, as previously mentioned, certain details have been set forth above to provide a sufficient understanding of the invention. However, it will be clear to one skilled in the art that the invention may be practiced without these particular details. In other instances, well-known circuits, control signals, timing protocols, and software operations have not been shown in detail in order to avoid unnecessarily obscuring the invention.

From the foregoing it will further be appreciated that, although specific embodiments of the invention have been described herein for purposes of illustration, various modifications may be made without deviating from the spirit and scope of the invention. For example, embodiments of the present invention have been described as being implemented in a video processor. However, embodiments of the present invention may be implemented in other systems where motion estimation is desirable, such as a computer system, video displays, televisions, and the like. More generally, embodiments of the present invention may be implemented in general processing environments, where the motion estimation described herein are carried out by a general purpose computer. Accordingly, the invention is not limited except as by the appended claims.

What is claimed is:

1. A method for performing motion estimation between a reference image and a search image, the reference image divided into an array of pixel blocks, the method comprising:

determining for each pixel block in the reference image a first vector identifying a pixel block in the search image to which the pixel block in the reference image is matched;

compiling the modes of vectors for all of the pixel blocks of the reference image and organizing the modes according to descending frequency of occurrence;

selecting from the compiled modes of vectors the major modes;

calculating a first error measure for a selected pixel block based on the pixel block of the search image identified by the first vector; and starting with the vector mode occurring the most frequently and proceeding in descending order of frequency for each of the major modes, calculating a current error measure for the selected pixel block based on the current vector of the major modes, and comparing the error measure associated with the pixel block with the current vector, and if the comparison indicates a better match, associating the current vector with the selected pixel block.

2. The method of claim 1 wherein a better match is indicated if the difference between the first and second error measures exceeds a match criterion.

3. The method of claim 1 wherein the dimension of the pixel block for the reference and search images is sixteen by sixteen pixels.

4. The method of claim 1, further comprising:

identifying the major modes of the vectors for the pixel blocks of the reference image;

calculating a respective error measure for the selected pixel block of the reference image using each of the major modes; and comparing the first error measure to the error measures calculated for the major modes and assigning a new vector to the selected reference image if one of the major modes provides a better match.

5. The method of claim 1 wherein the first and second error measures comprise a block sum of absolute differences.

6. The method of claim 1 wherein determining for each pixel block in the reference image a first vector comprises:

attributing a motion vector from a lower resolution pixel block to respective related higher resolution blocks; and refining the attributed motion vector for each of the higher resolution blocks.

7. A method for performing motion estimation between a reference image and a search image, the reference image divided into an array of pixel blocks, the method comprising:

for a first pixel resolution, determining for each pixel block in the reference image a first vector identifying a pixel block in the search image to which the pixel block in the reference image is matched;

for a second pixel resolution, attributing the first vector of a respective pixel block of the first resolution to the pixel blocks of the second resolution;

refining the attributed vectors of the pixel blocks of the second resolution to provide a respective motion vector for each pixel block of the second resolution;

compiling a list of the motion vectors of the pixel blocks of the second resolution in descending order of the frequency of occurrence;

identifying the motion vectors occurring more times than a threshold value as the major modes;

calculating error measures based on the major modes for a selected pixel block of the second resolution;

comparing an error measure for the selected pixel block based on the refined vector to the error measures based on the major modes to determine if a better match to a pixel block of the second resolution exists; and where a better match is determined, associating the vector yielding the better match with the selected pixel block.

8. The method of claim 7 wherein determining a first vector for each pixel block in the reference image, attributing the first vector to pixel blocks of the second resolution, refining the attributed vectors, compiling a list of the motion vectors, identifying the major modes, calculating error measures, and where a better match is determined, associating the vector yielding the better match, are repeated until completed for an original resolution of the reference and search images.

9. The method of claim 7 wherein the second resolution is finer than the first resolution.

10. The method of claim 7 wherein refining the attributed vectors of the pixel blocks of the second resolution comprises:

for the pixel blocks in the reference image, calculating an initial error measure with respect to the pixel block in the search image to which the respective attributed vector points;

calculating an error measure with respect to pixel blocks in the search image in the vicinity of where the respective attributed vector points;

comparing the initial error measure with the calculated error measures for the pixel blocks in the vicinity; and if a better match is determined, associating the vector pointing to the better matching pixel block in the search image with the pixel block in the reference image.

11. The method of claim 10 wherein calculating an error measure with respect to pixel blocks in the vicinity of where the respective attributed vector points comprises calculating an error measure for pixel blocks surrounding the pixel in the search image to which the respective attributed vector points.

12. The method of claim 7 wherein calculating error measures based on the major modes comprises:

for the pixel blocks in the reference image, calculating an initial error measure with respect to the pixel block in the search image to which the refined attributed vector points;

calculating an error measure with respect to each pixel block in the search image to which the vectors of the major modes identify;

comparing the initial error measure with the calculated error measures for the major modes beginning with the most frequently occurring mode and continuing in descending order of frequency; and if a better match is determined, associating the vector pointing to the better matching pixel block in the search image with the pixel block in the reference image.

13. The method of claim 7, further comprising:

calculating a respective predicted motion vector for pixel blocks of a subsequent reference image from the motion vectors determined for the pixel blocks of a previous reference image;

compiling a list of the motion vectors for the pixel blocks of the subsequent reference image in descending order of the frequency of occurrence;

determining the major modes of the motion vectors for the subsequent image;

refining the predicted motion vectors of the subsequent reference image; and determining if a better match can be made based on the major modes of the motion vectors for the subsequent reference image for each pixel block of the subsequent reference image.

14. The method of claim 13 wherein the pixel blocks of the subsequent reference image have a level of resolution lower for the pixel blocks of the previous image.

15. A method for estimating motion between a reference image and a search image, the reference and search images divided into arrays of reference and search pixel blocks, respectively, the method comprising:

for a first pixel resolution, determining motion vectors for each pixel block of the reference image through block motion estimation;

for a second finer pixel resolution, attributing the motion vector of the reference pixel blocks of the first resolution to related reference pixel blocks of the second resolution;

refining the attributed motion vectors of the reference pixel blocks of the second resolution;

calculating the frequency of occurrence of the motion vectors for the reference pixel blocks of the second resolution;

for each reference pixel block of the second resolution, calculating an initial error measure with respect to the search pixel block to which the refined attributed vector points and calculating an error measure with respect to each search pixel block identified by the motion vectors occurring the most frequently;

comparing the initial error measure with the calculated error measures for the major modes beginning with the most frequently occurring mode and continuing in descending order of frequency to determine whether any of the motion vectors occurring the most frequently yields a better match with a search pixel block of the second resolution; and where a better match is determined, associating the motion vector yielding the better match with the respective reference pixel block of the second resolution.

16. The method of claim 15 wherein refining the attributed motion vector of the pixel blocks of the second resolution comprises:

calculating an initial error measure with respect to a pixel block in the search image to which the respective attributed motion vector points;

calculating an error measure for pixel blocks in a reference image with respect to pixel blocks in a search image in the vicinity of where the attributed motion vector points;

comparing the initial error measure with the calculated error measures for the pixel blocks in the vicinity; and if a better match is determined, associating the motion vector pointing to the better matching pixel block in the search image with the pixel block in the reference image.

17. The method of claim 15 wherein determining motion vectors for pixel blocks of the reference image for a first pixel resolution comprises using a block motion estimation technique.

18. The method of claim 15 wherein calculating an error measure comprises determining a sum of absolute differences between a pixel block in the reference image and a pixel block in the search image.

19. The method of claim 15 wherein determining motion vectors for each pixel block in the reference image for the first pixel resolution, attributing the motion vector of the reference pixel blocks to related pixel blocks of the second resolution, refining the respective attributed vectors, calculating the frequency of occurrence of the motion vectors, determining whether any of the most frequently occurring motion vectors yields a better match, and where a better match is determined, associating the vector yielding the better match, are repeated until completed for an original resolution of the reference and search images.

20. The method of claim 15, further comprising:

calculating, a respective predicted motion vector for pixel blocks a subsequent reference image from the motion vectors determined for the pixel blocks of a previous reference image;

compiling a list of the motion vectors for the pixel blocks of the subsequent reference image in descending order of the frequency of occurrence;

determining the major modes of the motion vectors for the subsequent image;

refining the predicted motion vectors of the subsequent reference image; and determining if a better match can be made based on the major modes of the motion vectors for the subsequent reference image for each pixel block of the subsequent reference image.

21. The method of claim 20 wherein the pixel blocks of the subsequent reference image have a level of resolution lower for the pixel blocks of the previous image.

22. A method for refining block motion vectors for a video image sequence, comprising:

determining respective motion vectors for pixel blocks of an image of the video image sequence;

compiling a list of the motion vectors for the image in descending order of the frequency of occurrence;

defining the motion vectors occurring more times than a threshold value as the major modes of the motion vectors for the image; and for each pixel block of the image, determining if a better match can be made based on the major modes of the motion vectors for the image.

23. The method of claim 22 wherein determining a respective motion vector comprises attributing a motion vector from a related lower resolution pixel block and refining the respective attributed motion vector for each pixel block.

24. The method of claim 23 wherein refining the respective attributed motion vector for each pixel block comprises:
  calculating an error measure for a pixel block in a reference image with respect to pixel blocks in a search image in the vicinity of the pixel block in the search image to which the attributed motion vector points; and
  if a better match is determined, associating the vector pointing to the better matching pixel block in the search image with the pixel block in the reference image.

25. The method of claim 22 wherein determining if a better match can be made comprises:
  calculating for a pixel block of a reference image an error value for every pixel block of a search image to which the major modes of the motion vectors point; and
  comparing the calculated error values to an initial error value, the initial error value representing an error measure between the pixel block of the reference image and the pixel block of the search image identified by the motion vector determined initially for the pixel block.

26. The method of claim 22 wherein determining a respective motion vector for each pixel block, compiling a list of the motion vectors for the image, defining the motion vectors occurring more times than the threshold value as the major modes, and determining for each pixel block if a better match can be made is repeated for successively higher levels of resolution until completed for an original level of resolution.

27. The method of claim 26, further comprising:
  calculating a respective predicted motion vector for pixel blocks a subsequent image of the video image sequence from the motion vectors determined for the pixel blocks of a previous image;
  compiling a list of the motion vectors for the pixel blocks of the subsequent image in descending order of the frequency of occurrence;
  determining the major modes of the motion vectors for the subsequent image;
  refining the predicted motion vectors of the subsequent image; and
  determining if a better match can be made based on the major modes of the motion vectors for the subsequent image for each pixel block of the subsequent image.

28. The method of claim 27 wherein the pixel blocks of the subsequent image have a level of resolution lower for the pixel blocks of the previous image.

29. An apparatus for refining block motion vectors for a video image sequence, the apparatus structured to determine a respective motion vector for each pixel block of an image of the video image sequence, compile a list of the motion vectors for the image in descending order of the frequency of occurrence, define the motion vectors occurring more times than a threshold value as the major modes of the motion vectors for the image, and for each pixel block of the image, determine if a better match can be made based on the major modes of the motion vectors for the image.

30. An apparatus for estimating motion between a reference image and a search image, the reference image divided into an array of reference and search pixel blocks, respectively, the apparatus structured to determine for a first pixel resolution motion vectors for each pixel block of the reference image through block motion estimation, attribute the motion vector of the reference pixel blocks of the first resolution to related reference pixel blocks of a second finer resolution, refine the attributed motion vectors of the reference pixel blocks of the second resolution, calculate the frequency of occurrence of the motion vectors for the reference pixel blocks of the second resolution, determine for each reference pixel block of the second resolution whether any of the motion vectors occurring the most frequently yields a better match with a search pixel block of the second resolution, and where a better match is determined, associate the motion vector yielding the better match with the respective reference pixel block of the second resolution.

31. apparatus for performing motion estimation between a reference image and a search image, the reference image divided into an array of pixel blocks, the apparatus determining for each pixel block in the reference image a first vector identifying a pixel block in the search image to which the pixel block in the reference image is matched, compiling the modes of vectors for the pixel blocks of the reference image and organizing the modes according to descending frequency of occurrence, and for a selected pixel block of the reference image, calculating a first error measure for the selected pixel block based on the pixel block of the search image identified by the first vector, calculating a second error measure for the selected pixel block based on the pixel block of the search image identified by the vector having the greatest frequency of occurrence, comparing the first and second error measures, and associating the vector having the greatest frequency of occurrence with the selected pixel block if the second error measure indicates a better match.

32. An apparatus for performing motion estimation between a reference image and a search image, the reference image divided into an array of pixel blocks, the apparatus structure to determine at a first pixel resolution for each pixel block in the reference image a first vector identifying a pixel block in the search image to which the pixel block in the reference image is matched, attribute the first vector of a respective pixel block of the first resolution to the pixel blocks of a second resolution, refine the attributed vectors of the pixel blocks of the second resolution to provide a respective motion vector for each pixel block of the second resolution, compile a list of the motion vectors of the pixel blocks of the second resolution in descending order of the frequency of occurrence, identify the motion vectors occurring more times than a threshold value as the major modes, calculate error measures based on the major modes for a selected pixel block of the second resolution, compare an error measure for the selected pixel block based on the refined vector to the error measures based on the major modes to determine if a better match to a pixel block of the second resolution exists, and where a better match is determined, associate the vector yielding the better match with the selected pixel block.

33. An apparatus for displaying a sequence of video images, comprising:
  a video display having an array of picture elements on which the video images are displayed; and
  motion estimation circuitry coupled to the video display for refining block motion vectors for a video image sequence, the motion estimation circuitry structured to determine a respective motion vector for each pixel block of an image of the video image sequence, compile a list of the motion vectors for the image in descending order of the frequency of occurrence, define the motion vectors occurring more times than a threshold value as the major modes of the motion vectors for the image, and for each pixel block of the image, determine if a better match can be made based on the major modes of the motion vectors for the image.

34. An apparatus for displaying a sequence of video images, comprising:

a video display having an array of picture elements on which the video images are displayed; and motion estimation circuitry coupled to the video display for estimating motion between a reference image and a search image of the sequence of video images, each image divided into an array of reference and search pixel blocks, respectively, the motion estimation circuitry structured to determine for a first pixel resolution motion vectors for each pixel block of the reference image through block motion estimation, attribute the motion vector of the reference pixel blocks of the first resolution to related reference pixel blocks of a second finer resolution, refine the attributed motion vectors of the reference pixel blocks of the second resolution, calculate the frequency of occurrence of the motion vectors for the reference pixel blocks of the second resolution, determine for each reference pixel block of the second resolution whether any of the motion vectors occurring the most frequently yields a better match with a search pixel block of the second resolution, and where a better match is determined, associate the motion vector yielding the better match with the respective reference pixel block of the second resolution.

35. A method for performing motion estimation between a reference image and a search image, the reference image divided into an array of pixel blocks, the method comprising:

for a first pixel resolution, determining for each pixel block in the reference image a first vector identifying a pixel block in the search image to which the pixel block in the reference image is matched;

for a second pixel resolution, attributing the first vector of a respective pixel block of the first resolution to the pixel blocks of the second resolution;

refining the attributed vectors of the pixel blocks of the second resolution;

determining major modes of the vectors of the pixel blocks of the second resolution;

for a selected pixel block of the second resolution in the reference image, calculating an initial error measure with respect to the pixel block in the search image to which the refined attributed vector points and calculating an error measure with respect to each pixel block in the search image to which the vectors of the major modes identify;

comparing the initial error measure with the calculated error measures for the major modes beginning with the most frequently occurring mode and continuing in descending order of frequency to determine if a better match to a pixel block of the second resolution exists; and where a better match is determined, associating the vector pointing to the better matching pixel block in the search image with the selected pixel block of the second resolution in the reference image.

36. The method of claim 35 wherein determining a first vector for each pixel block in the reference image, attributing the first vector to pixel blocks of the second resolution, refining the attributed vectors, determining the major modes of the vectors, calculating an initial error and an error measure, comparing the initial error with the calculated error measures, and where a better match is determined, associating the vector pointing to the better matching pixel block in the search image, are repeated until completed for an original resolution of the reference and search images.

37. The method of claim 35 wherein the second resolution is finer than the first resolution.

38. The method of claim 35 wherein refining the attributed vectors of the pixel blocks of the second resolution comprises:

for the pixel blocks in the reference image, calculating an initial error measure with respect to the pixel block in the search image to which the respective attributed vector points;

calculating an error measure with respect to pixel blocks in the search image in the vicinity of where the respective attributed vector points;

comparing the initial error measure with the calculated error measures for the pixel blocks in the vicinity; and if a better match is determined, associating the vector pointing to the better matching pixel block in the search image with the pixel block in the reference image.

39. The method of claim 38 wherein calculating an error measure with respect to pixel blocks in the vicinity of where the respective attributed vector points comprises calculating an error measure for pixel blocks surrounding the pixel in the search image to which the respective attributed vector points.

40. The method of claim 35 wherein determining the major modes of the vectors comprises:

compiling a list of the vectors for the image in descending order of the frequency of occurrence; and identifying the motion vectors occurring more times than a threshold value as the major modes.

41. The method of claim 35, further comprising:

calculating a respective predicted motion vector for pixel blocks of a subsequent reference image from the motion vectors determined for the pixel blocks of a previous reference image;

compiling a list of the motion vectors for the pixel blocks of the subsequent reference image in descending order of the frequency of occurrence;

determining the major modes of the motion vectors for the subsequent image;

refining the predicted motion vectors of the subsequent reference image; and determining if a better match can be made based on the major modes of the motion vectors for the subsequent reference image for each pixel block of the subsequent reference image.

42. The method of claim 41 wherein the pixel blocks of the subsequent reference image have a level of resolution lower for the pixel blocks of the previous image.

43. A method for performing motion estimation between a reference image and a search image, the reference image divided into an array of pixel blocks, the method comprising:

for a first pixel resolution, determining for each pixel block in the reference image a first vector identifying a pixel block in the search image to which the pixel block in the reference image is matched;

for a second pixel resolution, attributing the first vector of a respective pixel block of the first resolution to the pixel blocks of the second resolution;

refining the attributed vectors of the pixel blocks of the second resolution;

determining major modes of the vectors of the pixel blocks of the second resolution;

calculating error measures based on the major modes for a selected pixel block of the second resolution;

comparing an error measure for the selected pixel block based on the refined vector to the error measures based on the major modes to determine if a better match to a pixel block of the second resolution exists;

where a better match is determined, associating the vector yielding the better match with the selected pixel block;

calculating a respective predicted motion vector for pixel blocks of a subsequent reference image from the motion vectors determined for the pixel blocks of a previous reference image;

compiling a list of the motion vectors for the pixel blocks of the subsequent reference image in descending order of the frequency of occurrence;

determining the major modes of the motion vectors for the subsequent image;

refining the predicted motion vectors of the subsequent reference image; and determining if a better match can be made based on the major modes of the motion vectors for the subsequent reference image for each pixel block of the subsequent reference image.

44. The method of claim 43 wherein determining a first vector for each pixel block in the reference image, attributing the first vector to pixel blocks of the second resolution, refining the attributed vectors, determining the major modes of the vectors, calculating error measures, and where a better match is determined, associating the vector yielding the better match, are repeated until completed for an original resolution of the reference and search images.

45. The method of claim 43 wherein the second resolution is finer than the first resolution.

46. The method of claim 43 wherein refining the attributed vectors of the pixel blocks of the second resolution comprises:

for the pixel blocks in the reference image, calculating an initial error measure with respect to the pixel block in the search image to which the respective attributed vector points;

calculating an error measure with respect to pixel blocks in the search image in the vicinity of where the respective attributed vector points;

comparing the initial error measure with the calculated error measures for the pixel blocks in the vicinity; and if a better match is determined, associating the vector pointing to the better matching pixel block in the search image with the pixel block in the reference image.

47. The method of claim 46 wherein calculating an error measure with respect to pixel blocks in the vicinity of where the respective attributed vector points comprises calculating an error measure for pixel blocks surrounding the pixel in the search image to which the respective attributed vector points.

48. The method of claim 43 wherein determining the major modes of the vectors of the pixel blocks of the second resolution comprises:

compiling a list of the vectors for the image in descending order of the frequency of occurrence; and identifying the motion vectors occurring more times than a threshold value as the major modes.

49. The method of claim 43 wherein calculating error measures based on the major modes comprises:

for the pixel blocks in the reference image, calculating an initial error measure with respect to the pixel block in the search image to which the refined attributed vector points;

calculating an error measure with respect to each pixel block in the search image to which the vectors of the major modes identify;

comparing the initial error measure with the calculated error measures for the major modes beginning with the most frequently occurring mode and continuing in descending order of frequency; and if a better match is determined, associating the vector pointing to the better matching pixel block in the search image with the pixel block in the reference image.

50. A method for estimating motion between a reference image and a search image, the reference image divided into an array of reference and search pixel blocks, respectively, the method comprising:

for a first pixel resolution, determining motion vectors for each pixel block of the reference image through block motion estimation;

for a second finer pixel resolution, attributing the motion vector of the reference pixel blocks of the first resolution to related reference pixel blocks of the second resolution;

refining the attributed motion vectors of the reference pixel blocks of the second resolution;

calculating the frequency of occurrence of the motion vectors for the reference pixel blocks of the second resolution;

determining for each reference pixel block of the second resolution whether any of the motion vectors occurring the most frequently yields a better match with a search pixel block of the second resolution;

where a better match is determined, associating the motion vector yielding the better match with the respective reference pixel block of the second resolution; and repeating determining motion vectors for each pixel block in the reference image for the first pixel resolution, attributing the motion vector of the reference pixel blocks to related pixel blocks of the second resolution, refining the respective attributed vectors, calculating the frequency of occurrence of the motion vectors, determining whether any of the most frequently occurring motion vectors yields a better match, and where a better match is determined, associating the vector yielding the better match, until completed for an original resolution of the reference and search images.

51. The method of claim 50 wherein refining the attributed motion vector of the pixel blocks of the second resolution comprises:

calculating an initial error measure with respect to a pixel block in the search image to which the respective attributed motion vector points;

calculating an error measure for pixel blocks in a reference image with respect to pixel blocks in a search image in the vicinity of where the attributed motion vector points;

comparing the initial error measure with the calculated error measures for the pixel blocks in the vicinity; and if a better match is determined, associating the motion vector pointing to the better matching pixel block in the search image with the pixel block in the reference image.

52. The method of claim 50 wherein determining motion vectors for pixel blocks of the reference image for a first pixel resolution comprises using a block motion estimation technique.

53. The method of claim 50 wherein determining for each reference pixel block of the second resolution whether any of the motion vectors occurring the most frequently yields a better match with a search pixel block of the second resolution comprises:

for the pixel blocks in the reference image, calculating an initial error measure with respect to the pixel block in the search image to which the refined attributed vector points;

calculating an error measure with respect to each pixel block in the search image identified by the motion vectors occurring the most frequently;

comparing the initial error measure with the calculated error measures for the major modes beginning with the most frequently occurring mode and continuing in descending order of frequency; and if a better match is determined, associating the vector pointing to the better matching pixel block in the search image with the pixel block in the reference image.

54. The method of claim 53 wherein calculating an error measure comprises determining a sum of absolute differences between a pixel block in the reference image and a pixel block in the search image.

55. The method of claim 50, further comprising:

calculating a respective predicted motion vector for pixel blocks a subsequent reference image from the motion vectors determined for the pixel blocks of a previous reference image;

compiling a list of the motion vectors for the pixel blocks of the subsequent reference image in descending order of the frequency of occurrence;

determining the major modes of the motion vectors for the subsequent image;

refining the predicted motion vectors of the subsequent reference image; and determining if a better match can be made based on the major modes of the motion vectors for the subsequent reference image for each pixel block of the subsequent reference image.

56. The method of claim 55 wherein the pixel blocks of the subsequent reference image have a level of resolution lower for the pixel blocks of the previous image.

57. A method for estimating motion between a reference image and a search image, the reference image divided into an array of reference and search pixel blocks, respectively, the method comprising:

for a first pixel resolution, determining motion vectors for each pixel block of the reference image through block motion estimation;

for a second finer pixel resolution, attributing the motion vector of the reference pixel blocks of the first resolution to related reference pixel blocks of the second resolution;

refining the attributed motion vectors of the reference pixel blocks of the second resolution;

calculating the frequency of occurrence of the motion vectors for the reference pixel blocks of the second resolution;

determining for each reference pixel block of the second resolution whether any of the motion vectors occurring the most frequently yields a better match with a search pixel block of the second resolution;

where a better match is determined, associating the motion vector yielding the better match with the respective reference pixel block of the second resolution;

calculating a respective predicted motion vector for pixel blocks a subsequent reference image from the motion vectors determined for the pixel blocks of a previous reference image;

compiling a list of the motion vectors for the pixel blocks of the subsequent reference image in descending order of the frequency of occurrence;

determining the major modes of the motion vectors for the subsequent image;

refining the predicted motion vectors of the subsequent reference image; and determining if a better match can be made based on the major modes of the motion vectors for the subsequent reference image for each pixel block of the subsequent reference image.

58. The method of claim 57 wherein refining the attributed motion vector of the pixel blocks of the second resolution comprises:

calculating an initial error measure with respect to a pixel block in the search image to which the respective attributed motion vector points;

calculating an error measure for pixel blocks in a reference image with respect to pixel blocks in a search image in the vicinity of where the attributed motion vector points;

comparing the initial error measure with the calculated error measures for the pixel blocks in the vicinity; and if a better match is determined, associating the motion vector pointing to the better matching pixel block in the search image with the pixel block in the reference image.

59. The method of claim 57 wherein determining motion vectors for pixel blocks of the reference image for a first pixel resolution comprises using a block motion estimation technique.

60. The method of claim 57 wherein determining for each reference pixel block of the second resolution whether any of the motion vectors occurring the most frequently yields a better match with a search pixel block of the second resolution comprises:

for the pixel blocks in the reference image, calculating an initial error measure with respect to the pixel block in the search image to which the refined attributed vector points;

calculating an error measure with respect to each pixel block in the search image identified by the motion vectors occurring the most frequently;

comparing the initial error measure with the calculated error measures for the major modes beginning with the most frequently occurring mode and continuing in descending order of frequency; and if a better match is determined, associating the vector pointing to the better matching pixel block in the search image with the pixel block in the reference image.

61. The method of claim 60 wherein calculating an error measure comprises determining a sum of absolute differences between a pixel block in the reference image and a pixel block in the search image.

62. The method of claim 57 wherein determining motion vectors for each pixel block in the reference image for the first pixel resolution, attributing the motion vector of the reference pixel blocks to related pixel blocks of the second resolution, refining the respective attributed vectors, calculating the frequency of occurrence of the motion vectors, determining whether any of the most frequently occurring motion vectors yields a better match, and where a better match is determined, associating the vector yielding the better match, are repeated until completed for an original resolution of the reference and search images.

63. A method for refining block motion vectors for a video image sequence, comprising:
   determining respective motion vectors for pixel blocks of an image of the video image sequence;
   identifying the major modes of the motion vectors for the image;
   for each pixel block of the image, determining if a better match can be made based on the major modes of the motion vectors for the image;
   repeating the determining a respective motion vector for each pixel block, identifying the major modes of the motion vectors, and determining for each pixel block if a better match can be made, for successively higher levels of resolution until completed for an original level of resolution;
   calculating a respective predicted motion vector for pixel blocks a subsequent image of the video image sequence from the motion vectors determined for the pixel blocks of a previous image;
   compiling a list of the motion vectors for the pixel blocks of the subsequent image in descending order of the frequency of occurrence;
   determining the major modes of the motion vectors for the subsequent image;
   refining the predicted motion vectors of the subsequent image; and
   determining if a better match can be made based on the major modes of the motion vectors for the subsequent image for each pixel block of the subsequent image.

64. The method of claim 63 wherein determining a respective motion vector comprises attributing a motion vector from a related lower resolution pixel block and refining the respective attributed motion vector for each pixel block.

65. The method of claim 64 wherein refining the respective attributed motion vector for each pixel block comprises:
   calculating an error measure for a pixel block in a reference image with respect to pixel blocks in a search image in the vicinity of the pixel block in the search image to which the attributed motion vector points; and
   if a better match is determined, associating the vector pointing to the better matching pixel block in the search image with the pixel block in the reference image.

66. The method of claim 63 wherein identifying the major modes of the motion vectors comprises:
   compiling a list of the motion vectors for the image in descending order of the frequency of occurrence; and
   defining the motion vectors occurring more times than a threshold value as the major modes.

67. The method of claim 63 wherein determining if a better match can be made based on the major modes of the motion vectors for the image comprises:
   calculating for a pixel block of a reference image an error value for every pixel block of a search image to which the major modes of the motion vectors point; and
   comparing the calculated error values to an initial error value, the initial error value representing an error measure between the pixel block of the reference image and the pixel block of the search image identified by the motion vector determined initially for the pixel block.

68. The method of claim 63 wherein the pixel blocks of the subsequent image have a level of resolution lower for the pixel blocks of the previous image.

* * * * *